US012664360B2

(12) United States Patent
Agarwal

(10) Patent No.: US 12,664,360 B2
(45) Date of Patent: Jun. 23, 2026

(54) GENERATING INSTRUCTIONS FOR CONFIGURING RESOURCES USED BY INTERNAL SERVICES OF AN ONLINE SYSTEM USING A GENERATIVE MODEL

(71) Applicant: Maplebear Inc., San Francisco, CA (US)

(72) Inventor: Anant Agarwal, Sunnyvale, CA (US)

(73) Assignee: Maplebear Inc., San Francisco, CA (US)

( * ) Notice: Subject to any disclaimer, the term of this patent is extended or adjusted under 35 U.S.C. 154(b) by 316 days.

(21) Appl. No.: 18/374,443

(22) Filed: Sep. 28, 2023

(65) Prior Publication Data

US 2025/0111140 A1     Apr. 3, 2025

(51) Int. Cl.
*G06F 40/20* (2020.01)
*G06F 11/34* (2006.01)

(52) U.S. Cl.
CPC .......... *G06F 40/20* (2020.01); *G06F 11/3495* (2013.01)

(58) Field of Classification Search
None
See application file for complete search history.

(56) References Cited

U.S. PATENT DOCUMENTS

| | | | |
|---|---|---|---|
| 11,875,189 B2 * | 1/2024 | Wellum | G06F 9/4881 |
| 2022/0300812 A1 * | 9/2022 | Yeleshwarapu | G06N 3/09 |
| 2023/0071278 A1 * | 3/2023 | Karri | G06F 9/5055 |

OTHER PUBLICATIONS

Somashekar and Kumar, "Enhancing the Configuration Tuning Pipeline of Large-Scale Distributed Applications Using Large Language Models (Idea Paper)", ICPE '23, Apr. 15-19, 2023 (Year: 2023).*

* cited by examiner

*Primary Examiner* — Nicole A K Schmieder
(74) *Attorney, Agent, or Firm* — Fenwick & West LLP

(57) ABSTRACT
An online system manages various internal services using network resources or computing resources. Managing the internal services involves generating executable instructions for provisioning new services or for changing or monitoring existing services. To generate executable instructions for allocating or for monitoring network resources, the online system maintains a database of previously generated executable instructions for provisioning resources along with information about various previously generated instructions, such as comments on the executable instructions or past performance information for the previously generated instructions. To generate instructions for a new internal service, the online system tunes a large language model (LLM) with the database and provides prompts to LLM to generate executable instructions for the internal service based the prompts.

17 Claims, 4 Drawing Sheets

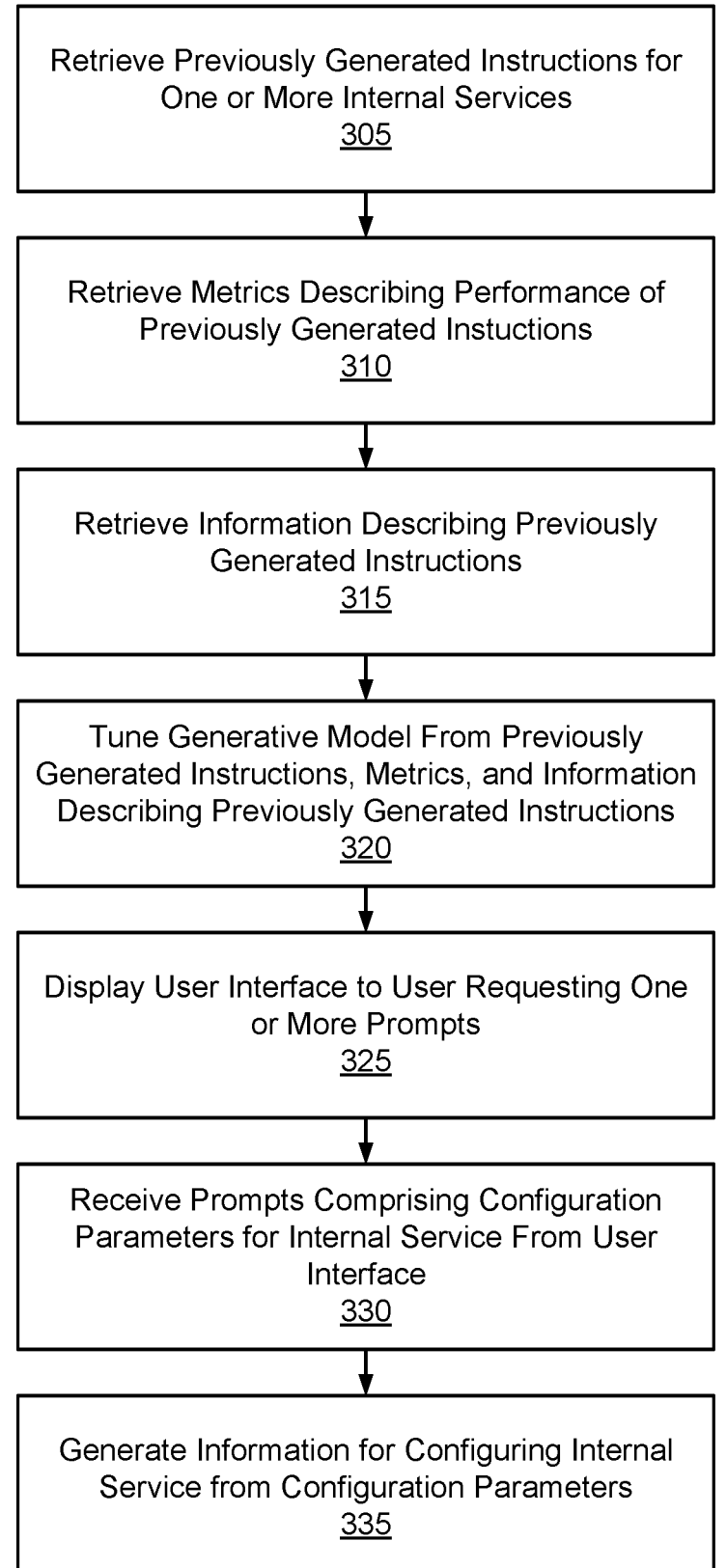

Retrieve Previously Generated Instructions for One or More Internal Services
305

Retrieve Metrics Describing Performance of Previously Generated Instuctions
310

Retrieve Information Describing Previously Generated Instructions
315

Tune Generative Model From Previously Generated Instructions, Metrics, and Information Describing Previously Generated Instructions
320

Display User Interface to User Requesting One or More Prompts
325

Receive Prompts Comprising Configuration Parameters for Internal Service From User Interface
330

Generate Information for Configuring Internal Service from Configuration Parameters
335

FIG. 3

GENERATING INSTRUCTIONS FOR CONFIGURING RESOURCES USED BY INTERNAL SERVICES OF AN ONLINE SYSTEM USING A GENERATIVE MODEL

BACKGROUND

Many online systems generate infrastructure for internal services for use by users of an online system. For example, an online system creates and maintains a database that includes information from a user of the online system. As an example, a database created by an online system includes various information about items or services offered by a user. Other internal services capture information about resources of the online system used when performing one or more functions for a user.

To generate infrastructure for an internal service, an online system generates instructions that, when executed by a processor, provision resources (such as computing resources or network resources) for use by the internal service. For example, the online system generates instructions that allocate storage for a database and that specify structure and format of the database and of data included in the database. Similarly, an online system generates instructions that, when executed, capture information describing resource usage of an internal service or of a particular function provided by the online system.

Conventional online systems provide a user interface where a user provides configuration information for an internal service to be provided by the online system. Based on the configuration information, the online system generates instructions that, when executed, allocate or provision resources for performing the internal service. While the instructions generated by conventional online systems provisions resources for the internal service, the instructions are not optimally configured for variations in resource consumption or usage over time. As different internal services provide different functions and are used with different frequencies, the initial provisioning of resources for the internal service based on the user's configuration information, causing the user to modify the instructions for the internal service over time to account for variations in usage.

SUMMARY

In accordance with one or more aspects of the disclosure, an online system, such as an online concierge system, maintains various internal services for its users. The online system provisions and maintains computing resources, network resources, or other resources used by an internal service to provide one or more functionalities. Example internal services include maintaining one or more databases for a retailer or other user, monitoring resource usage by one or more other internal services, monitoring data input and output from an internal service, or other allocation or monitoring of computing resources or network resources.

A user of the online system may request configuration of an internal service by the online system for subsequent use by the user. In turn, the online system generates and executes instructions that provision resources (e.g., network resources computing resources) or the internal service, that monitor resource usage, that monitor data traffic, or that perform one or more other actions to implement the internal service. For example, the internal service is a database maintained by the online system including various items offered by a retailer. To create the database, the online system generates instructions that, when executed by a processor, allocate computing resources for the database and specify a structure and a format for the database. The online system may also generate instructions that, when executed by the processor, determine a measure of data traffic into the database or extracted from the database. When generating instructions for provisioning an internal service, the online system may modify previously generated instructions for another internal service, with the modifications altering resource allocation or functionality relative to the previously generated instruction. In various embodiments, the online system generates a pull request that includes comments or other information identifying the modifications to the previously generated instructions for review by the user prior to execution.

While configuration parameters received from a user allow the online system to generate instructions for creating, for monitoring, or for modifying an internal service based on the user's specifications, the generated instructions base resource allocation or operation on prior configuration or provisioning of other internal services or based on standards for different types of resource provisioning. Because the generated instructions are based on other internal services and the configuration parameters from the user, the generated instructions provide an initial configuration that the user modifies over time through evaluation and experimentation to optimize for data usage or other implementation details particular to the user. Further, data traffic or data usage over time affects how resources provisioned for an internal service created for the user scale over time, with such changes in data traffic affecting how to optimally allocate resources for the internal service to minimize a likelihood of the user subsequently manually modifying the allocation of resources.

To simplify generating instructions for configuring an internal service, the online system retrieves previously generated instructions stored by the online system for other internal services. Additionally, the online system retrieves information describing previously generated instructions from one or more sources. In various embodiments, the information describing previously generated instructions comprises comments corresponding to different sets of previously generated instructions. For example, the online system retrieves one or more pull requests for a set of previously generated instructions, where a pull request for the set of instructions includes a description of differences between different versions of the set of instructions. The pull request may identify the differences between the different versions of the set of instructions and include comments describing the identified differences in various embodiments. Additionally or alternatively, the information describing a set of previously generated instructions are comments included in a file that also includes the set of previously generated instructions, in various embodiments. Information describing the set of previously generated instructions may be retrieved from various locations, such as from one or more message threads identifying the set of previously generated instructions, or from other communication channels including messages associated with the set of previously generated instructions. Hence, in various embodiments, at least some of the information describing the set of previously generated instructions is retrieved from sources that are distinct from the previously generated instructions. Retrieving information describing previously generated instructions provides the online system with contextual information describing the previously generated instructions, such as information about one or more modifications to the previously generated instructions or information identifying reasons for various values or configurations of the previously generated instructions.

Additionally, the online system retrieves one or more metrics describing performance of previously generated instructions. One or more of the metrics may be determined from historical performance data and stored in association with a corresponding set of previously generated instructions. In some embodiments, one or more of the metrics are determined or captured in real-time or in near-real time. Further, one or more of the metrics may be predicted performance metrics for a set of previously generated instructions based on prior performance data for the set of previously generated instructions to describe expected performance of the set of previously generated instructions. Such predicted performance metrics are based on values of the set of previously generated instructions and on data or resource usage of the set of previously generated instructions. Hence, in various embodiments, the retrieved metrics may describe resource usage (e.g., computing resource usage, network resource usage) by an internal service configured by previously generated instructions or may describe predicted resource usage by the internal service configured by the previously generated instructions.

The online system leverages the previously generated instructions, the information describing the previously generated instructions, and the one or more metrics describing performance of the previously generated instructions to tune a generative model. In various embodiments, the generative model is a large language model initially comprising a set of weights determined from training the large language model on a text corpus. The online system generates multiple supplemental examples for a training dataset used to tune the generative model to output information for configuring an internal service of the online system. Each training example includes a prompt and one or more of: previously generated instructions corresponding to the prompt, the information describing the previously generated instructions corresponding to the prompt, and the one or more metrics describing performance of the previously generated instructions corresponding to the prompt. Hence, each training example identifies instructions for configuring an internal service expected to be generated when the prompt included in the training example is received.

The online system tunes the generative model by augmenting the corpus on which the generative model was trained with the supplemental examples. This provides the generative model with additional examples of prompts and corresponding sets of one or more of: instructions for configuring an internal service, comprising information describing previously generated instructions, comprising metrics describing execution of the internal service, or any combination thereof. In various embodiments, one or more embeddings are generated for each supplemental example and stored in a GPT index, allowing comparison of embeddings for subsequently received prompts to the supplemental examples added to the corpus for the generative model. Based on measures of similarity between an embedding for a received prompt and embeddings for supplemental examples the generative model identifies a supplemental example having a maximum measure of similarity to the received prompt. The generative model is subsequently applied to the received prompt and to the identified supplemental example, with the identified supplemental example augmenting the received prompt to provide the generative model with additional context for generating information for configuring an internal service.

Including information describing the set of previously generated instructions and one or more metrics describing performance of the set of previously generated instructions in supplemental examples allows the generative model to account for contextual information identifying different relationships between portions of instructions corresponding to different scenarios where the instructions are implemented. This contextual information allows the generative model to leverage prior optimizations performed on sets of previously generated instructions based on different resource availabilities, different amounts of usage, or other variations in resource usage or data traffic for different sets of previously generated instructions.

After tuning, the online system stores the generative model. Subsequently, the online system presents a user interface requesting or more prompts for the generative model from a user. For example, the online system presents the user interface in response to receiving a request from the user to configure an internal service for the user. As an example, in response to the online system receiving a request to generate a database for the user, the online system generates a user interface requesting one or more prompts from the user. The user interface may include different fields or otherwise identify one or more prompts to obtain from the user. Each prompt received via the user interface identifies one or more configuration parameters for the internal service from the user. The user interface may receive unstructured text data from the user as one or more prompts in some embodiments. In some embodiments, a configuration parameter received via the user interface identifies a type of internal service for the user, while one or more additional configuration parameters received via the user interface include information identifying expected resource usage by the internal service or one or more functionalities to be provided by the internal service.

The generative model receives one or more configuration parameters from the user interface as one or more prompts that are input to the generative model. Based on the configuration parameters, the generative model outputs information for configuring the internal service requested by the user. In different embodiments, the generative model generates different types of information for configuring the internal service requested by the user. For example, the information for configuring the internal service comprises instructions that, when executed by a processor, cause the processor to allocate resources for the internal service. Such generated instructions specify one or more amounts of different resources to allocate for the internal service. For example, the instructions specify a size of a database, and may specify dimensions or formatting of the database. Further, the information may be instructions that, when executed by the processor, cause the processor to capture one or more metrics or to determine one or more metrics for the internal service.

Alternatively, the information for configuring the internal service comprises one or more modifications to previously generated instructions corresponding to the internal service. For example, the information is a pull request corresponding to previously generated instructions or the internal service, with the pull request identifying modifications between a modified version of the previously generated instructions determined by the generative model and the stored version of the previously generated instructions. The pull request may include comments describing the identified differences in various embodiments. In other embodiments, the information for configuring the internal service identifies modifications to previously stored instructions using other formats.

In other embodiments, the information for configuring the internal service comprises one or more recommendation messages describing potential modifications to previously generated instructions for review by a user. For example, a recommendation message includes unstructured text describing one or more modifications to previously generated instructions and information identifying the previously generated instructions. The user may subsequently modify the previously generated instructions based on one or more of the recommendation messages to generate instructions for provisioning the internal service requested by the user. In various embodiments, the user specifies a format for the information for configuring the internal service via the user interface or through another setting, allowing different users to specify different formats for receiving the information for configuring the internal service from the generative model. Through the user interface and the generative model, the online system simplifies generation of instructions, or other information, for provisioning resources for an internal service maintained by the online system. Training the generative model based on previously generated instructions for configuring internal services, information describing the previously generated instructions, and performance of the previously generated instructions allows the information for configuring an internal service generated by the online system to account for prior optimization of the previously generated instructions by the online system and relationships between instructions so the generated instructions are optimized for a particular implementation of the internal service.

BRIEF DESCRIPTION OF THE DRAWINGS

FIG. 3 is a flowchart of a method for generating instructions for computing resource allocation using a trained generative model, in accordance with one or more embodiments.

DETAILED DESCRIPTION

Figure 1:
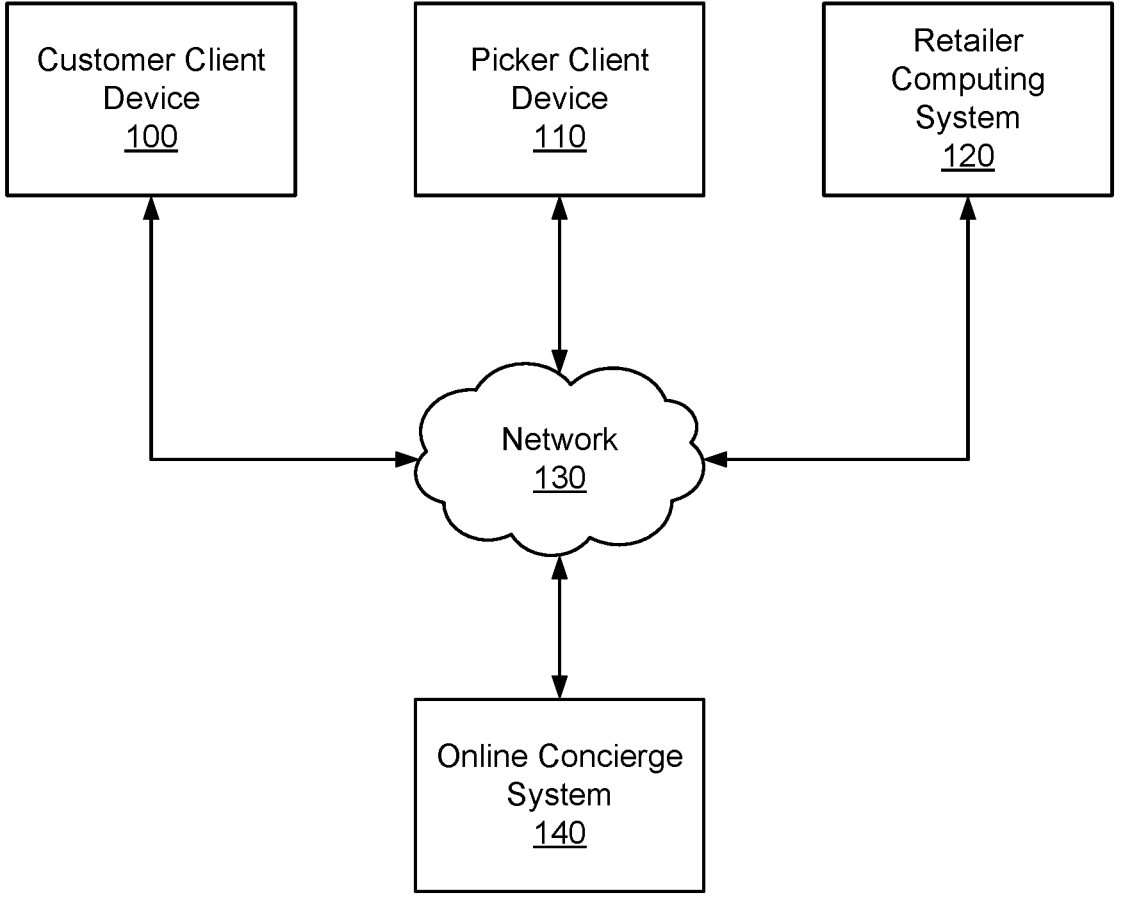
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
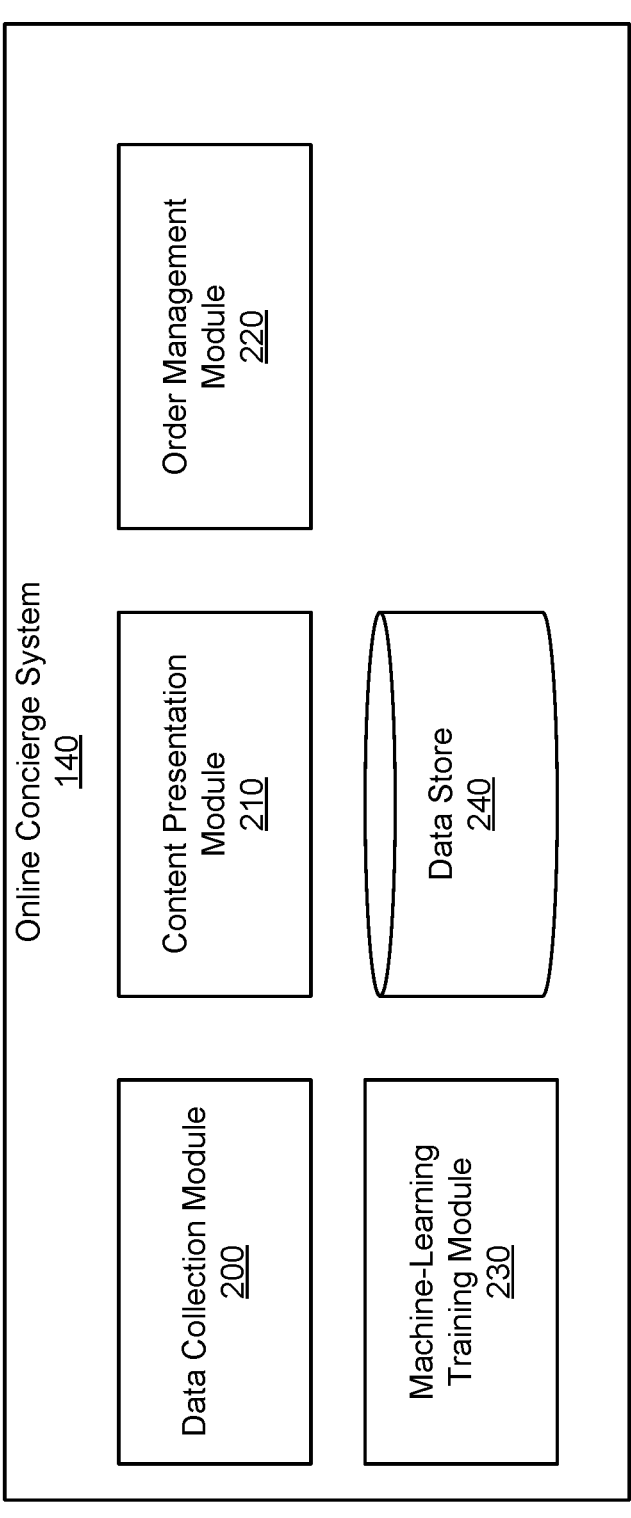
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

In some embodiments, the content presentation model 210 generates and presents a user interface requesting one or more prompts comprising configuration parameters for a process to be executed by the online concierge system 140, also referred to herein as an "internal service" of the online concierge system 140. In various embodiments, the user interface dynamically modifies one or more prompts requested from the user based on a previously received prompt from the user. As further described below in conjunction with FIGS. 3 and 4, a prompt received from the user interface is provided to a trained generative model as an input, so the user interface obtains configuration parameters from the user that are used to generate information for configuring an internal service.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 tunes one or more generative models that receive unstructured text as input and generates one or more outputs based on the unstructured text. A generative model is a large language model in various embodiments. For example, a generative model may be generative pre-trained transformer models (GPTs) in various embodiments. For example, a generative model is a large language model previously trained on a text corpus to output text in response to a text prompt from a user. The machine learning training model 230 generates supplemental examples including prompts and corresponding text for outputting in response to the prompts and applies the generative model to each training example. Through a backpropagation process from comparing output text predicted by the generative model for a prompt in a training example to text included in the training example, the machine learning training model 230 modifies one or more weights in one or more layers of the generative model. This allows the generative model to be tailored to a specific application based on the content of the supplemental examples, so the machine learning training model 230 optimizes a large language model initially trained on a general text corpus to provide output specific to a particular implementation.

For example, the machine learning training model 230 generates a training dataset with multiple supplemental examples that each include one or more prompts and previously generated instructions for configuring an internal service. A training example may also include information describing the previously generated instructions, and one or more metrics describing performance of the previously generated instructions. Hence, each training example includes a prompt and information for configuring an "internal service," which is a process executed by the online concierge system 140, based on the prompt. For example, a prompt is one or more configuration parameters for the internal service. As further described below in conjunction with FIGS. 3 and 4, tuning the generative model based on supplemental examples of prompts and instructions for configuring an internal service tailors the generative model to output information for configuring an internal service based on received configuration parameters, reducing an amount of time and user interaction with the online concierge system 140 to configure and to optimize an internal service.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

FIG. 3 is a flowchart of a method for generating instructions for computing resource allocation using a trained generative model, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140); however, in other embodiments, the steps may be performed by another type of online system. Additionally, each of these steps may be performed automatically by the online concierge system without human intervention.

An online system, such as an online concierge system 140, executes one or more processes to provide functionality to users. These processes executed by the online concierge system 140 are referred to herein as "internal services." Example internal services include maintaining a database for information from a user, capturing specific data received by the online concierge system 140, capturing data transmitted by the online concierge system 140, determining one or more metrics describing performance of another internal service, or performing other functionality. The internal services provided by the online concierge system 140 use network resources or other computing resources to provide corresponding functionality. For example, the online concierge system 140 maintains one or more databases for a retailer, such as an item database for a retailer that identifies items offered by the retailer. The item database may be included in a data store 240 maintained by the online concierge system 140, as further described above in conjunction with FIG. 2, with the online concierge system 140 generating and executing instructions for provisioning resources used by the item database. Similarly, the online concierge system 140 maintains an order management module 220 providing one or more interfaces to customers, to shoppers, or to retailers. The order management module 220 receives data from a customer or from a shopper and processes the data to provide information about an order to the customer or information for fulfilling the order to the shopper. An internal service may capture data received from the customer or transmitted to a shopper by the order management module 220 based on corresponding instructions generated and subsequently executed by the online concierge system 140.

Hence, the online concierge system 140 provisions computing resources or network resources to an internal service during configuration of the internal service. For example, executable instructions for creating an item database or other database, when executed, allocate computing resources for the item database and specify the structure and the format of different fields of the item database. Similarly, the online concierge system 140 generates executable instructions that, when executed, monitor data transmitted or received through an internal service, with the instructions identifying a type of data to monitor and a source or a destination from which data is monitored; the instructions may also display one or more messages or other information in response to transmitted or received data satisfying one or more criteria specified by the instructions. Further, to provision an internal service, the online concierge system 140 may modify one or more previously generated instructions to modify resources previously allocated to another internal service to provision resources for the internal service. The online concierge system 140 generates a pull request identifying the modifications to the previously generated instructions to allow a user requesting the internal service to review resource provisioning for the internal service. Hence, instructions generated by the online concierge system 140 for an internal service provision resources used by the internal service or determine how to monitor resources used by an internal service.

In various embodiments, instructions for configuring an internal service generated by the online concierge system 140 comprise instructions encoded on a non-transitory computer readable storage medium that, when executed by a processor, cause the processor to provision computing resources (e.g., storage resources or network resources), to monitor or capture received or transmitted data identified by the instructions, or provide other functionality identified by the instructions. Instructions for configuring the internal service may be generated by the online concierge system 140 retrieving and modifying modifies one or more previously generated instructions for configuring other. When the online concierge system 140 modifies previously generated instructions, the online concierge system 140 generates a pull request including comments or other information identifying the modifications to the previously generated instructions in various embodiments. In other embodiments, the online concierge system 140 generates one or more recommendation messages identifying potential modifications to previously generated instructions for review by a user, enabling the user to subsequently modify the previously generated instructions based on one or more of the recommendation messages.

The online concierge system 140 allows a user, such as a retailer, to specify one or more configuration parameters for an internal service maintained by the online concierge system 140. Based on the one or more configuration parameters, the online concierge system 140 generates instructions for configuring the internal service. When executed, the generated instructions provision resources (e.g., computing resource, network resources) for the internal service, identify data to monitor, generate one or more metrics, or provide other functionality. This allows the online concierge system 140 to tailor resources provisioned for an internal service, data monitored for an internal service, a metric generated for an internal service, or other functionality for an internal service for a specific user based on the configuration parameters. While the configuration parameters from the user allow initial configuration of an internal service (e.g., an initial provisioning of network resources or computing resources) for a user, optimal allocation of resources for the internal service is based on prior configuration or provisioning of other internal services or based on standards for different types of resource provisioning. As data traffic or data usage varies based on interaction with and operation of the internal service over time affects scaling of resource usage over time by the internal service, with the temporal scaling of resource usage causing modification of the internal service's configuration over time to optimize resource allocation based on use of the internal service. Conventionally, the user modifies the configuration of the internal service based on evaluation of the internal service's performance over time or experimentation with effects of modifications to the internal service on the internal service's performance.

To simplify generation of instructions for an internal service and optimization of configuration of the internal service, the online concierge system 140 retrieves 305 previously generated instructions configuring internal services stored by the online concierge system 140. In various embodiments, the online concierge system 140 retrieves different files including previously stored instructions, with different files corresponding to different internal services previously configured by the online concierge system 140. For example, instructions for configuring one or more internal services are stored in the data store 240 of the online concierge system 140.

Additionally, the online concierge system 140 retrieves 310 metrics describing performance of an internal service corresponding to retrieved previously generated instructions. For example, one or more metrics describe resource usage (e.g., computing resource usage, network resource usage) by an internal service created by previously generated instructions for an internal service. As another example, one or more metrics comprise captured data input to or output by an internal service. In another example, a metric describes predicted performance of the internal service based on captured data input to or output by the internal service, resources used by the internal service, or other information. Hence, the retrieved metrics provide one or more indications of performance of the internal service. In some embodiments, a set of metrics are stored by the online concierge system 140 and retrieved 310, while another set of metrics are obtained in real-time or in near real-time by the online concierge system 140 monitoring resource usage for an internal service corresponding to the internal service. Alternatively, the metrics are obtained in real-time or near real-time from monitoring of data received by or output by an internal service corresponding to the stored instructions. One or more metrics may be retrieved 305 from sources separate from the previously stored instructions, such as from messages or files stored in a different database or different storage location than the previously generated instructions that identify the internal service corresponding to the previously generated instructions.

The online concierge system 140 also retrieves 315 information describing the previously generated instructions for an internal service or describing one or more modifications to previously generated instructions for an internal service. For example, the online concierge system 140 retrieves multiple versions of the previously stored instructions, with each version including a modification to at least one instruction relative to another version. The information describing previously generated instructions may identify differences between the previously generated instructions and a prior version of the previously stored instructions. Information describing a modification to a previously stored instruction in a version of previously stored instructions also includes one or more comments corresponding to a modification to the stored instruction relative to an earlier version of the previously stored instructions. The comments may be included with a modification to previously generated instructions, such as included in a file comprising the previously generated instructions, in various embodiments. Alternatively, the comments are included in a separate file than the previously generated instructions. For example, the comments are included in a log file associated with the previously stored instructions. Additionally or alternatively, one or more comments describing modification of the stored instructions are retrieved 315 from one or more message threads or other sources separate from the previously generated instructions identifying an internal service corresponding to the previously generated instructions. Retrieving 315 comments associated with previously generated instructions obtains contextual information describing the previously generated instructions, such as information about one or more modifications to the previously generated instructions.

Based on the previously generated instructions, the metrics describing resource usage by previously generated instructions, and the information describing previously generated instructions, the online concierge system 140 trains 320 a generative model. The generative model receives text input as input and outputs information describing how to allocate resources for an internal service corresponding to the text input. For example, the generative model outputs instructions that, when executed by a processor, cause the processor to generate or to allocate resources having characteristics satisfying the received text input. As another example, the generative model outputs modifications to one or more previously generated instructions based on the input, and may identify the modifications relative to the previously generated instructions through a pull request or other format that identifies modifications of the generated instructions relative to the previously generated instructions. In other embodiments, the generative model outputs one or more recommendation messages including unstructured text describing modifications to previously generated instructions for review by a user, who may subsequently alter structured text comprising previously generated instructions identified by a recommendation message based on the one or more recommendation messages.

In various embodiments, the generative model is a large language model tuned 320 from a training dataset including multiple supplemental examples based on the retrieved previously generated instructions, the one or more metrics associated with the previously generated instructions, and the information describing the previously generated instructions. The large language model comprising the generative model initially comprises a set of weights determined from training the large language model on a text corpus, with the initial set of weights stored on a non-transitory computer readable storage medium in various embodiments. The online concierge system 140 tunes 320 the generative model on a training dataset based on previously generated instructions for configuring internal services to tailor the generative model to generate instructions for configuring internal services in response to unstructured text prompts received from users.

For tuning 320, the online concierge system 140 generates multiple supplemental examples for the training dataset. Each training example includes a prompt and one or more of: previously generated instructions corresponding to the prompt, the information describing the previously generated instructions corresponding to the prompt, or the one or more metrics describing performance of the previously generated instructions corresponding to the prompt. Hence, each training example identifies instructions for configuring an internal service expected to be generated when the prompt included in the training example is received.

In various embodiments, the online concierge system 140 generates an index, such as a GPT index, from a prompt, corresponding previously generated instructions for configuring an internal service, information describing the previously generated instructions, and metrics describing performance of the internal service. The GPT index provides an intermediate representation of supplemental examples. For example, the GPT index generates embeddings corresponding to different portions, or tokens, of previously generated instructions, prompts, information describing previously generated instructions, metrics describing execution of an internal service. In other examples, the GPT index generates a tree index maintaining relationships between tokens of supplemental examples, with tokens in higher levels in a tree including more general information about tokens in lower levels of the tree or generates a list index where different tokens of supplemental examples are sequentially organized. Other forms of indices may be used to represent the previously generated instructions or metadata for generation of supplemental examples. When generating the GPT index, the online concierge system 140 may generate embeddings for various tokens comprising a prompt, comprising one or more instructions for configuring an internal service, comprising information describing previously generated instructions, comprising metrics describing execution of the internal service, or other information. Subsequently, the online concierge system 140 may leverage the embeddings to identify supplemental examples having embeddings with at least a threshold measure of similarity to embeddings for a received prompt.

The online concierge system 140 applies the generative model to each training example of the training dataset. Based on a comparison of predicted instructions output by the generative model for a prompt included in a training example to the previously generated instructions included in the training example, one or more weights of the generative model are modified through backpropagation or another suitable process until one or more criteria are satisfied. In some embodiments, the tuning 320 modifies weights in one or more layers, such as in a final layer, of the generative model. The online concierge system 140 stores the set of parameters comprising the generative model on a non-transitory computer readable storage medium after stopping the backpropagation.

Alternatively, the online concierge system 140 tunes 320 the generative model by augmenting the corpus on which the generative model was trained with the supplemental examples. This provides the generative model with additional examples of prompts and corresponding sets of one or more of: instructions for configuring an internal service, comprising information describing previously generated instructions, comprising metrics describing execution of the internal service, or any combination thereof. The supplemental examples provide the generative model with information used to identify the most relevant portions of the generative model for generating particular information. In various embodiments, one or more embeddings are generated for each supplemental example and are stored in a GPT index, simplifying comparison of embeddings for subsequently received prompts to the prompts included in the supplemental examples added to the corpus for the generative model. Based on measures of similarity between an embedding for a received prompt and embeddings for supplemental examples added to the corpus, the generative model identifies a supplemental example with an embedding having a maximum measure of similarity to the embedding for the received prompt. The generative model includes the instructions for configuring an internal service included in the identified supplemental example or the embedding for the identified supplemental example as an additional prompt along with the received prompt. In various embodiments, the additional prompt is an embedding representing the identified supplemental example. Based on the received prompt and the additional prompt selected based on the received prompt, the generative model outputs information for configuring an internal service.

In various embodiments, after tuning 320, the generative model receives one or more configuration parameters for an internal service as a prompt, supplements the prompt with an additional prompt comprising a supplemental example identified based on the prompt, and generates information for configuring the internal service that a user leverages to obtain instructions that, when executed by the online concierge system, configure the internal service subject to the configuration parameters. By tuning 320 the generative model based on prompts associated with previously generated instructions corresponding to the prompt, the information describing the previously generated instructions corresponding to the prompt, and the one or more metrics describing performance of the previously generated instructions corresponding to the prompt, the online concierge system 140 leverages a previously trained large language model for a more specific application of generating instructions for configuring an internal service.

From tuning 320 based on previously generated instructions for one or more internal services along with metrics describing performance of corresponding previously generated instructions and information describing corresponding previously generated instructions, the generative model accounts for contextual information about previously generated instructions when determining an output. This allows the information for configuring an internal service output by the generative model in response to one or more prompts from a user to account for resource usage, implementation details, and amounts of data received or output by different previously generated instructions. For example, instructions for configuring an internal service output by the generative model are based on one or more configuration parameters describing resource usage or amounts of data traffic, with at least one configuration parameter specifying a type of the internal service being configured. Leveraging metrics describing performance of previously generated instructions and information describing previously generated instructions, the generative model outputs instructions for the internal service that are optimized based on prior usage and resource provisioning for other internal services. As various internal services provisioned by the online concierge system 140 operate with different data traffic patterns or different amounts of resources provisioned for the internal services, the output of the generative model allows the internal service to be initially optimized for usage, reducing subsequent modifications or refinements to the generated instruction by a user from whom the internal service was configured. As a user initially configuring an internal service may have limited information about how resource usage of the internal service may change over time, leveraging the metrics describing performance of previously generated instructions and information describing previously generated instructions allows the generative model initially configure the instructions for configuring the internal services based on performance or other internal services with similar configuration parameters or usage scenarios to the user's internal service, reducing time spent by the user modifying the generated instructions for the internal service over time.

With the generative model stored after being tuned 320, the online concierge system 140 displays 325 a user interface to a user in response to receiving a request from the user to create an internal service. In various embodiments, the user interface receives prompts from the user, with each prompt comprising text input from the user. For example, different prompts specify different configuration parameters from the user for the internal service. In various embodiments, the online concierge system 140 dynamically modifies one or more prompts requested from the user via the user interface based on one or more previously received prompts. For example, the online concierge system modifies one or more additional types of prompts requested from a user response to a configuration parameter received as a first prompt, with the modification of which additional prompts are requested by the user interface based on the first prompt. This allows the online concierge system 140 to tailor information obtained from the user for different internal services based on previously received information from the user via the user interface.

Through the prompts from the user interface, the online concierge system 140 receives 330 configuration parameters for an internal service to be implemented by the online concierge system 140. Example parameters include a type of the internal service and one or more metrics or description of an expected amount of usage of the internal service. For example, a configuration parameter identifies a type of internal service as a database, with other configuration parameters identifying a location of the database, an indication whether to monitor input to the database, an identifier of the database, an expected amount of data to be received by the database, or other information. As another example, a type of internal service is an identifier of an existing internal service, and one or more additional configuration parameters specify one or more changes to operation of the internal service. In another example, a type of internal service is data monitoring, and one or more additional configuration parameters specify another internal service to be monitored.

The online concierge system 140 generates 335 information for configuring an internal service based on the configuration parameters received 330 from the user through the user interface by applying the generative model to the received configuration parameters. For example, the online concierge system 140 maintains a GPT index, as further described above, of embeddings for various supplemental examples used to tune 320 the generative model determines an embedding corresponding to the configuration parameters received 330 from the user. Based on measures of similarity between the embeddings for configuration parameters received 330 from the user and embeddings for supplemental examples in the GPT index, the generative model identifies one or more supplemental examples in the GPT index with embeddings having at least a threshold measure of similarity to the embeddings for the received configuration parameters. The generative model generates instructions for configuring an internal service included in the one or more identified supplemental examples based on one or more prompts comprising the received configuration parameters and an additional prompt comprising previously generated instructions for configuring an internal service, the information describing the previously generated instructions, and one or more metrics describing execution of the previously generated instructions included in an identified supplemental example with an embedding maximum measure of similarity to the embedding for the configuration parameters. The additional prompt may be an embedding corresponding to the identified supplemental example in various embodiments. This supplements the one or more received configuration parameters with a training example similar to the configuration parameters. Application of the generative model to the configuration parameters and to the additional prompt generates 335 information for configuring the internal service for the user. In various embodiments, the online concierge system 140 publishes the information for configuring the internal service generated 335 by the generative model in a data repository, such as the data store 240, for subsequent access by the user from whom the configuration parameters were received 330. In various embodiments, the prompts received via the user interface are stored in the data repository in association with the generated information for configuring the internal service generated 335 by the generative model.

In some embodiments, the online concierge system 140 generates 335 a set of instructions that, when executed by a processor, cause the processor to provision computing resources or network resources to the internal service identified by the user. Alternatively, the online concierge system 140 generates 335 modified previously generated instructions by retrieving previously generated instructions based on the received configuration parameters and modifying the retrieved previously generated instructions based on one or more of the received configuration parameters. In other embodiments, the online concierge system 140 generates 335 one or more recommendation messages identifying potential modifications to previously generated instructions in unstructured text for review by a user or that describe how the user creates instructions through manual input to the online concierge system 140 to provision computing resources or network resources for the internal service.

As the generative model leverages previously generated instructions for internal services, information describing previously generated instructions, and one or more metrics describing performance of the previously generated instructions, the information for configuring the internal service for the user is optimized based on prior performance or modification to instructions provisioning or implementing other internal services. Hence, the generative model allows the user to generate instructions for implementing an internal service identifying limited information, such as a type of internal service and one or more configuration parameters, through application of the generative model. Using the generative model to generate 335 information for configuring an internal service simplifies subsequent implementation of the internal service as the output of the generative model accounts for prior configuration of other internal services over time, reducing subsequent action by the user to optimize or to refine operation or implementation of the internal service.

Figure 4:
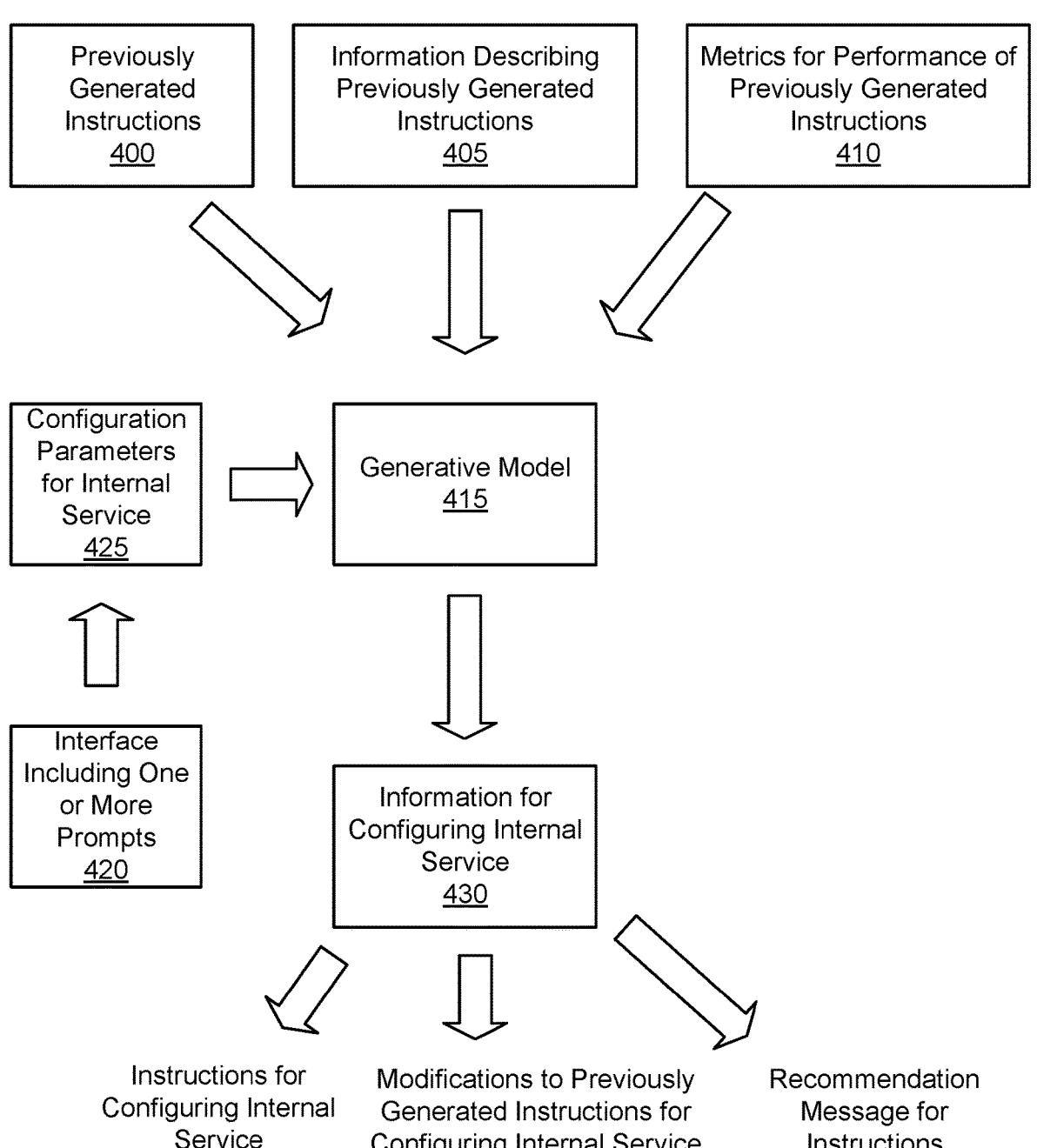
FIG. 4 is a process flow diagram of a method for generating instructions for computing resource allocation using a trained generative model, in accordance with one or more embodiments.

FIG. 4 is a process flow diagram of a method for generating instructions for resource allocation by an online concierge system 140 using a trained generative model. An online system, such as an online concierge system 140, maintains various internal services that use network resources, or other computing resources. Example internal services include maintaining one or more databases for a retailer or other user, monitoring resource usage by one or more internal services, monitoring data input and output from an internal service, or other allocation or monitoring of computing resources or network resources.

A user of the online system may request configuration of an internal service by the online system for subsequent use by the user. In turn, the online system generates and executes instructions that provision resources (e.g., network resources computing resources) or the internal service, that monitor resource usage, that monitor data traffic, or that perform one or more other actions to implement the internal service. For example, the internal service is a database maintained by the online system including various items offered by a retailer. To create the database, the online system generates instructions that, when executed by a processor, allocate computing resources for the database and specify a structure and a format for the database. The online system may also generate instructions that, when executed by the processor, determine a measure of data traffic into the database or extracted from the database. When generating instructions for provisioning an internal service, the online system may modify previously generated instructions for another internal service, with the modifications altering resource allocation or functionality relative to the previously generated instruction. In various embodiments, the online system generates a pull request that includes comments or other information identifying the modifications to the previously generated instructions for review by the user prior to execution.

Thus, the online system allows a user to specify configuration parameters for an internal service that the online system uses to generate instructions for configuring, for monitoring, or for modifying an internal service. This allows the online system to tailor resources provisioned for an internal service, configuration of the internal service, or monitoring of the internal service for a specific user. While the configuration parameters from the user allow initial provisioning of resources (e.g., computing resources, network resources) for the user's internal service, optimal allocation of resources for the user's internal service is based on prior configuration or provisioning of other internal services or based on standards for different types of resource provisioning. Further, data traffic or data usage over time affects how an internal service created for the user scales over time, with such changes in data traffic affecting how to create or to modify resources for the internal service to optimize resource allocation for the user.

To simplify generation of instructions for an internal service, the online system retrieves previously generated instructions 400 stored by the online system for other internal services. For example, the online system retrieves files generated for different internal services, with each file including one or more sets of instructions for configuring or for implementing an internal service. Additionally, the online system retrieves information 405 describing previously generated instructions from one or more sources. In various embodiments, the information 405 describing previously generated instructions comprises comments corresponding to different sets of previously generated instructions. For example, the online system maintains multiple versions of a set of instructions, with a version having one or more differences in the instructions relative to another version, so the online system retrieves one or more pull requests for a set of previously generated instructions. A pull request for the set of previously generated instructions includes a description of differences between different versions of the set of instructions. The pull request may identify the differences between the different versions of the set of instructions and include comments describing the identified differences in various embodiments. Additionally or alternatively, the information 405 describing a set of previously generated instructions are comments included in a file comprising the set of previously generated instructions, in various embodiments. Information 405 describing the set of previously generated instructions may be retrieved from various locations, such as from one or more sources external to the previously generated instructions (e.g., message threads identifying the set of previously generated instructions). Hence, in various embodiments, at least some of the information describing the set of previously generated instructions is retrieved from sources that are distinct from the previously generated instructions Retrieving information 405 describing previously generated instructions provides the online system with contextual information describing the previously generated instructions, such as information about one or more modifications to the previously generated instructions or information identifying reasons for various values or configurations of the previously generated instructions.

Additionally, the online system retrieves one or more metrics 410 describing performance of previously generated instructions. One or more of the metrics 410 may be determined from historical performance data and stored in association with a corresponding set of previously generated instructions. In some embodiments, one or more of the metrics 410 are determined or captured in real-time or in near-real time. Further, one or more of the metrics may be predicted performance metrics for a set of previously generated instructions based on prior performance data for the set of previously generated instructions to describe expected performance of the set of previously generated instructions. Such predicted performance metrics are based on values of the set of previously generated instructions and on data or resource usage of the set of previously generated instructions. Hence, in various embodiments, the retrieved metrics 410 may describe resource usage (e.g., computing resource usage, network resource usage) by an internal service created by previously generated instructions or may describe predicted resource usage by the internal service created by the previously generated instructions.

The online system leverages the previously generated instructions 400, the information 405 describing the previously generated instructions, and the one or more metrics 410 describing performance of the previously generated instructions to train a generative model 415. As further described above in conjunction with FIG. 3, the online system creates a training dataset for tuning the generative model 415 based on the previously generated instructions 400, the information 405 describing the previously generated instructions, and the one or more metrics 410 describing performance of the previously generated instructions. In various embodiments, the training dataset includes multiple supplemental examples each including a prompt describing an internal service and a corresponding set of previously generated instructions based on the prompt, and may include information 405 describing the set of previously generated instructions based on the prompt, as well as one or more metrics 410 describing performance of the set of previously generated instructions based on the prompt. As further described above in conjunction with FIG. 3, the online system augments a corpus used to train the generative model 415 with the supplemental examples, such as through a GPT index including embeddings generated for each supplemental example. Subsequently, the generative model retrieves a supplemental example having an embedding with a maximum measure of similarity to an embedding for a received prompt, using the supplemental example as an additional prompt for tailoring the output of the generative model based on the retrieved supplemental example. Hence, the generative model 415 determines connections or relationships between different instructions, such as relationships between different tokens representing different portions of instructions for execution by the online system from the previously generated instructions 400 and corresponding prompts. Including information 405 describing the set of previously generated instructions and one or more metrics 410 describing performance of the set of previously generated instructions in supplemental examples allows the generative model 415 to account for contextual information to identify different relationships between portions of instructions corresponding to different prompts where the instructions are implemented. This contextual information allows the generative model 415 to leverage prior optimizations performed on sets of instructions to account for different resource availability, different amounts of usage, or other variations in resource usage or data traffic affecting different sets of previously generated instructions.

After tuning, the online system stores the generative model 415. Subsequently, the online system presents a user interface 420 to obtain one or more prompts for the generative model 415 from a user. For example, the online system presents the user interface 420 in response to receiving a request from the user to create or to provision an internal service for the user. As an example, the online system receives a request to generate a database for the user, so the online system generates and presents a user interface 420 to obtain one or more prompts from the user, with each prompt identifying one or more configuration parameters 425 for the internal service. The user interface 420 receives unstructured text data from the user as one or more prompts in some embodiments. Further, the user interface 420 may modify one or more additional prompts requested from the user in response to a prompt previously received from the user, allowing the user interface 420 to dynamically modify prompts requested from the user based on one or more prompts previously received through the user interface 420. For example, a prompt identifies a type of internal service, with information requested as one or more additional prompts based on the type of internal service identified to the online system. In some embodiments, a configuration parameter 425 received via the user interface 420 identifies a type of internal service for the user, while one or more additional configuration parameters 425 received via the user interface 420 include information identifying expected resource usage by the internal service or one or more functionalities to be provided by the internal service, as further described above in conjunction with FIG. 3.

The generative model 415 receives the one or more configuration parameters 425 as input and outputs information 430 for configuring the internal service requested by the user. In different embodiments, the generative model 415 generates different types of information 430 for configuring the internal service requested by the user. For example, the information 430 for configuring the internal service comprises instructions that, when executed by a processor, cause the processor to allocate resources for the internal service, with the instructions specifying one or more amounts of different resources to allocate for the internal service. For example, the instructions specify a size of a database, and may specify dimensions or formatting of the database. Further, the information 430 may be instructions that, when executed by the processor, cause the processor to capture or to determine one or more metrics for the internal service.

Alternatively, the information 430 for configuring the internal service comprises one or more modifications to previously generated instructions corresponding to the internal service. For example, the information 430 is a pull request corresponding to previously generated instructions or the internal service, with the pull request identifying modifications between a modified version of the previously generated instructions output by the generative model 415 and the stored version of the previously generated instructions. The pull request may include comments describing the identified differences in various embodiments or otherwise identify differences in instructions between the previously generated instructions and the output of the generative model 415. In other embodiments, the information 430 for configuring the internal service identifies modifications to previously stored instructions using other formats.

In other embodiments, the information 430 for configuring the internal service comprises one or more recommendation messages describing potential modifications to previously generated instructions for review by a user presented as unstructured text. For example, a recommendation message includes unstructured text describing one or more modifications to previously generated instructions and information identifying the previously generated instructions. The user may subsequently modify the previously generated instructions based on one or more of the recommendation messages to generate instructions for provisioning the internal service requested by the user. In various embodiments, the user specifies a format for the information 430 for configuring the internal service via the user interface 420 or through another setting, allowing different users to specify different formats for receiving the information 430 for configuring the internal service from the generative model 415. Through the user interface 420 and the generative model 415, the online system simplifies generation of instructions, or other information, for provisioning resources for an internal service maintained by the online system. Training the generative model 415 based on previously generated instructions 400 for various internal services and information 410 describing the previously generated instructions and performance of the previously generated instructions allows the output of the generative model 415 to account for prior optimization of the previously generated instructions by the online system to account for various implementation parameters, reducing subsequent modification of the instructions for the internal service by the user.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

receiving, via a user interface, one or more configuration parameters for an internal service maintained by the computer system;

tuning a generative model, the generative model comprising a large language model, wherein the tuning comprises loading the generative model with a set of supplemental examples that each include:

a previously used prompt, information describing a set of previously generated instructions corresponding to the previously used prompt, and one or more metrics describing performance of the set of previously generated instructions corresponding to the previously used prompt;

prompting the tuned generative model to generate information for configuring the internal service, the prompt including the configuration parameters for the internal service;

receiving, from the tuned generative model, one or more recommendation messages comprising unstructured text that describes modifications to previously generated instructions;

providing the recommendation messages for review by a user at a user interface;

receiving, from the user via the user interface, a modification to the previously generated instructions included in the generated information, wherein the modification is based on the one or more recommendation messages;

publishing the generated information for configuring the internal service to a data repository for retrieval by the computer system to configure the internal service, wherein the publishing causes the data repository to store the generated information; and configuring the internal service using the generated information.

2. The method of claim 1, wherein generating the information for configuring the internal service comprises generating a set of instructions for allocating resources to the internal service based on the one or more configuration parameters.

3. The method of claim 1, wherein generating the information for configuring the internal service comprises generating a modified version of previously generated instructions with modifications to the previously generated instructions based on the one or more configuration parameters.

4. The method of claim 3, wherein generating the modified version of previously generated instructions comprises generating a pull request identifying modifications between the modified version of the previously generated instructions and the previously generated instructions.

5. The method of claim 1, wherein receiving one or more configuration parameters for the internal service maintained by the computer system from the user via the user interface comprises:

requesting one or more additional configuration parameters from the user in response to a previously received configuration parameter through the user interface.

6. The method of claim 1, wherein at least a portion of the information describing the set of previously generated instructions corresponding to the prompt is retrieved from one or more message threads associated with the set of previously generated instructions corresponding to the prompt.

7. The method of claim 1, wherein loading the generative model with the one or more metrics describing performance of the set of previously generated instructions corresponding to the prompt comprises loading the generative model with a prediction of resource usage by the set of previously generated instructions corresponding to the prompt.

8. The method of claim 1, wherein receiving the one or more configuration parameters comprises receiving a type of internal service maintained by the computing system.

9. A computer program product comprising a non-transitory computer readable storage medium having instructions encoded thereon that, when executed by a processor, cause the processor to perform steps comprising:

receiving, via a user interface, one or more configuration parameters for an internal service;

tuning a generative model, the generative model comprising a large language model, wherein the tuning comprises loading the generative model with a set of supplemental examples that each include:

a previously used prompt, information describing a set of previously generated instructions corresponding to the previously used prompt, and one or more metrics describing performance of the set of previously generated instructions corresponding to the previously used prompt;

prompting the tuned generative model to generate information for configuring the internal service, the prompt including the configuration parameters for the internal service;

receiving, from the tuned generative model, one or more recommendation messages comprising unstructured text that describes modifications to previously generated instructions;

providing the recommendation messages for review by a user at a user interface;

receiving, from the user via the user interface, a modification to the previously generated instructions included in the generated information, wherein the modification is based on the one or more recommendation messages;

publishing the generated information for configuring the internal service to a data repository for retrieval by the computer system to configure the internal service, wherein the publishing causes the data repository to store the generated information; and configuring the internal service using the generated information.

10. The computer program product of claim 9, wherein generating the information for configuring the internal service comprises generating a set of instructions for allocating resources to the internal service based on the one or more configuration parameters.

11. The computer program product of claim 9, wherein generating the information for configuring the internal service comprises generating a modified version of previously generated instructions with modifications to the previously generated instructions based on the one or more configuration parameters.

12. The computer program product of claim 11, wherein generating the modified version of previously generated instructions comprises generating a pull request identifying modifications between the modified version of the previously generated instructions and the previously generated instructions.

13. The computer program product of claim 9, wherein receiving one or more configuration parameters for the internal service maintained by the computer system from the user via the user interface comprises:

requesting one or more additional configuration parameters from the user in response to a previously received configuration parameter through the user interface.

14. The computer program product of claim 9, wherein at least a portion of the information describing the set of previously generated instructions corresponding to the prompt is retrieved from one or more message threads associated with the set of previously generated instructions corresponding to the prompt.

15. The computer program product of claim 9, wherein loading the generative model with the one or more metrics describing performance of the set of previously generated instructions corresponding to the prompt comprises loading the generative model with a prediction of resource usage by the set of previously generated instructions corresponding to the prompt.

16. The computer program product of claim 9, wherein receiving the one or more configuration parameters comprises receiving a type of internal service maintained by the computing system.

17. A system comprising:

a processor; and a non-transitory computer readable storage medium having instructions encoded thereon that, when executed by the processor, cause the processor to perform steps including:

receiving, via a user interface, one or more configuration parameters for an internal service maintained by the computer system;

tuning a generative model, the generative model comprising a large language model, wherein the tuning comprises loading the generative model with a set of supplemental examples that each include:

a previously used prompt, information describing a set of previously generated instructions corresponding to the previously used prompt, and one or more metrics describing performance of the set of previously generated instructions corresponding to the previously used prompt;

prompting the tuned generative model to generate information for configuring the internal service, the prompt including the configuration parameters for the internal service;

receiving, from the tuned generative model, one or more recommendation messages comprising unstructured text that describes modifications to previously generated instructions;

providing the recommendation messages for review by a user at a user interface;

receiving, from the user via the user interface, a modification to the previously generated instructions included in the generated information, wherein the modification is based on the one or more recommendation messages;

publishing the generated information for configuring the internal service to a data repository for retrieval by the computer system to configure the internal service, wherein the publishing causes the data repository to store the generated information; and configuring the internal service using the generated information.

\* \* \* \* \*